May 26, 1936. V. R. HON 2,042,400
OPTICAL CLASP
Filed Aug. 14, 1934
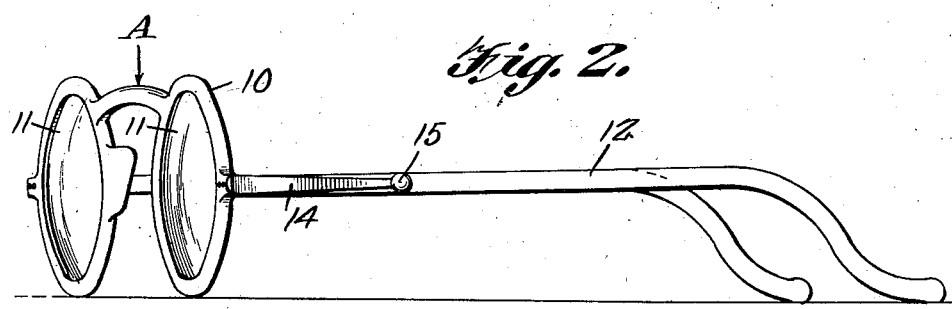
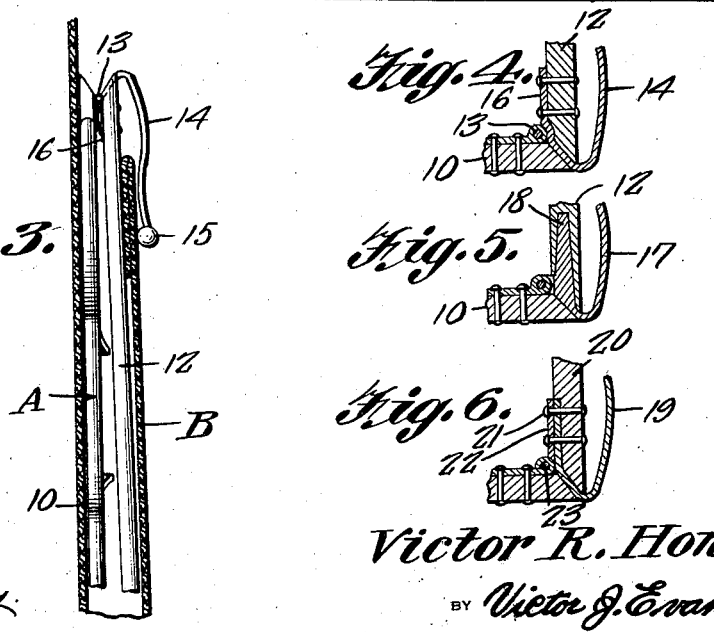
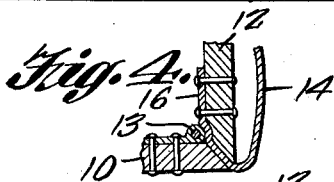
Victor R. Hon, INVENTOR Patented May 26, 1936

2,042,400

UNITED STATES PATENT OFFICE 2,042,400

OPTICAL CLASP

Victor R. Hon, Deming, N. Mex.

Application August 14, 1934, Serial No. 739,792

1 Claim. (Cl. 88—41)

The invention relates to a clasp and more especially to optical clasps for use on the temple bars and frame of spectacles or eye glasses.

The primary object of the invention is the provision of a clasp of this character, wherein at the hinge connection of a temple bar to the eye glass frame of spectacles is attached a clip which enables the eye glasses to be safely carried within the pocket of a user or wearer and when within the pocket will be attached or clamped to the garment to avoid the possibility of the dropping of the glasses from the person.

Another object of the invention is the provision of a clasp of this character, wherein the construction thereof is novel in form and the arrangement of the same new, as well as the application thereof.

A further object of the invention is the provision of a clasp of this character which is simple in construction, thoroughly reliable and effective for the purpose intended thereof, strong, durable, not detracting from the appearance of the article nor interfering with the sight when the spectacles or the eye glasses are worn, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing:

Figure 1 is a fragmentary top edge view of spectacles showing the clasp constructed in accordance with the invention applied thereto.

Figure 2 is a perspective view of the spectacles and clasp.

Figure 3 is a fragmentary vertical sectional view through a garment pocket showing the spectacles with the clasp attached thereto.

Figure 4 is a fragmentary detail sectional view at the hinge joint of one of the temple bars of the spectacles.

Figure 5 is a view similar to Figure 4 showing the modification.

Figure 6 is a view similar to Figure 5 showing a further modification.

Similar reference characters indicate corresponding parts throughout the several views in the drawing.

Referring to the drawing in detail, A designates generally spectacles, these being of the conventional type having a frame 10 for the glasses 11 and to this frame are hingedly connected the temple bars 12, the hinge for each bar being indicated at 13, and at this point is arranged the clasp embodying the present invention and hereinafter fully described.

The clasp comprises a slightly outwardly bowed spring finger or arm 14 having a ball terminal 15, the arm being gradually tapered in the direction of the ball terminal and at the wider end is joined with one of the leads 16 of the hinge 13 to be disposed outside of one of the temple bars 12, so that on the folding of the temple bars upon the frame 10 for the placing of the spectacles within the pocket of a garment, a portion of the pocket being indicated at B, the finger or arm 14 will clamp the pocket B for the fastening of the folded spectacles within the said pocket, as is clearly shown in Figure 3 of the drawing. The ball terminal 15 of the arm or finger 14 prevents damage to the fabric from which the pocket B is made, both in attaching and detaching the spectacles.

The frame 10 at the ends thereof, to which the temple bars are hinged, is slightly thickened outwardly and the inner face of the frame at said thickened portions is beveled or cut at an inward angle of a desired degree to provide shoulders which are contacted by the inner angle ends of the temple bars when the latter are in open position and thus retain the temple bars in proper spread or open position. In Figure 5 of the drawing, the inner angle and hinged end of the temple bar 12 is provided with a tapered socket, which has firmly wedged therein a tapered tongue 18 formed on the arched inner end of a spring metal clasp 17. The tongue has its outer widened end beveled to its juncture with the inner end of the clasp and this beveled surface contacts with the shoulder of the frame 10 and provides a wear surface therefor when the temple bar 12 is in open position, as clearly shown by the said Figure 4.

In Figure 6 of the drawing there is shown a further modification, wherein the spring arm 19 of the clip is counter-seated in the temple bar 20 and riveted, at 21, thereto, these rivets being also adapted to fasten one of the leaves 22 of the hinge 23 to the temple bar 20.

It is, of course, understood that the clip can be otherwise attached to a temple bar and frame of spectacles than heretofore referred to and shown in the drawing, but the same must be located at the hinge joint between the temple bar and the frame of the spectacles, this being contemplated within the scope of the invention.

What is claimed is:

In spectacles, a lens frame having swinging temple bars which are hingedly connected to the frame and which bars, at their hinged ends are beveled to contact with beveled surfaces on the frame when the temple bars are swung to open position, and each bar, at its hinged end has a tapered socket, and a metal spring clamp having a rounded end which merges into a comparatively thick tapered tongue that is designed to be received and held in the socket, and the outer wall between the tongue and the said round end of the clamp being disposed at an angle for contact with the said beveled end of the frame.

VICTOR R. HON.